Aug. 24, 1948.　　　T. D. NATHAN　　　2,447,712
CUSHIONING DEVICE

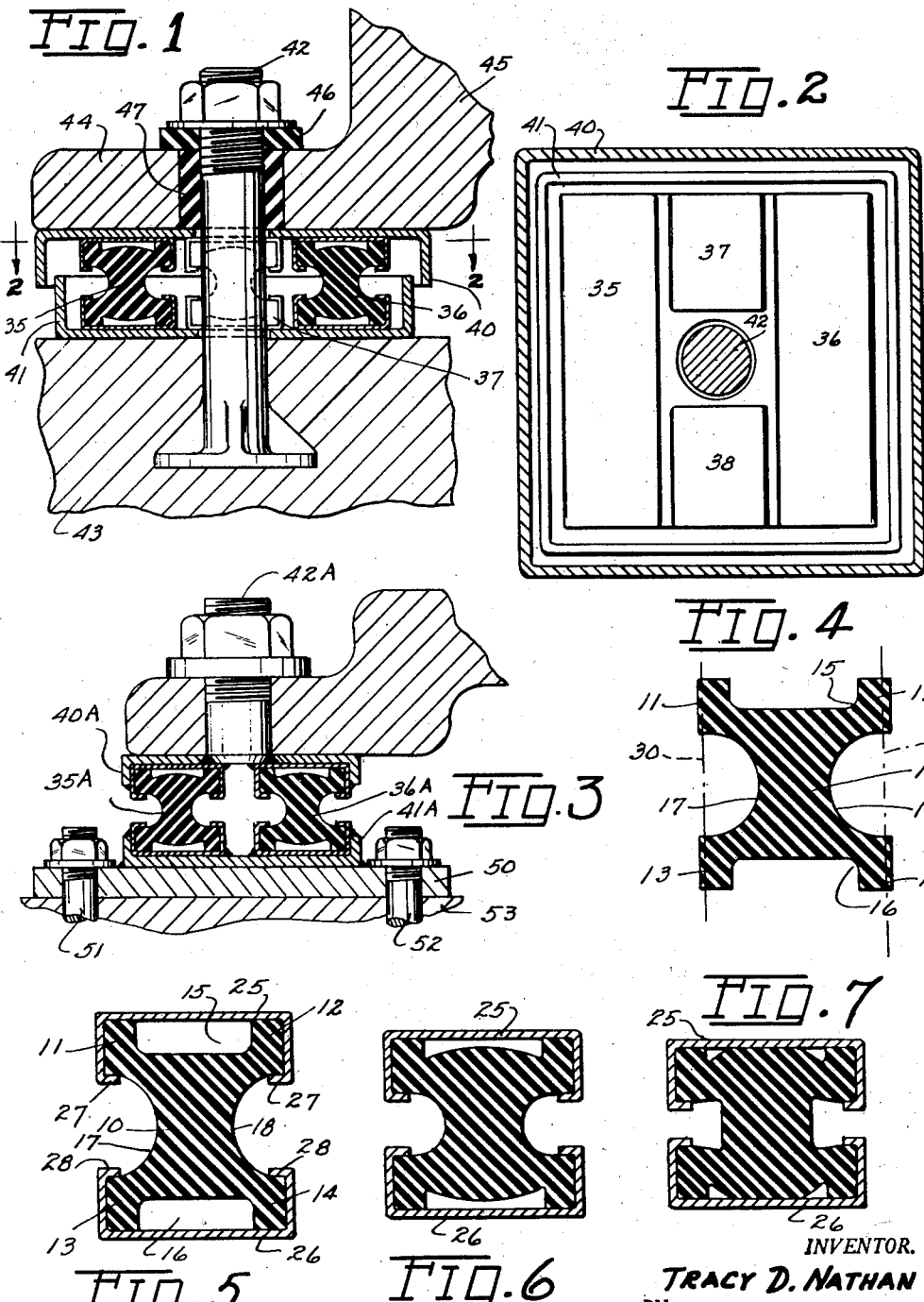

Filed Nov. 18, 1944　　　2 Sheets-Sheet 2

INVENTOR.
TRACY D. NATHAN
BY Bates, Teare, & McKee
ATTORNEYS

Patented Aug. 24, 1948

2,447,712

UNITED STATES PATENT OFFICE 2,447,712

CUSHIONING DEVICE

Tracy D. Nathan, Cuyahoga Falls, Ohio, assignor of one-third to Theodore S. Rowe, Kent, Ohio, and one-third to James M. W. Chamberlain, Akron, Ohio Application November 18, 1944, Serial No. 564,028

7 Claims. (Cl. 248—358)

This invention relates to devices adapted to be interposed between two objects or parts thereof for absorbing shock for dampening the transmission of sound, and for permitting a limited relative movement between the two objects while at the same time resiliently opposing such movement.

Heretofore, rubber loaded in shear has been used for isolating vibration but the difficulty has been that such mountings involved serious problems of resonance, rubber fatigue, deterioration and weight distribution, as well as the dangerous factor of overload. Additionally, the installations usually involved alterations of the machine, as well as the construction of special supports, thereby requiring each assembly to be custom built, or specially designed, and increasing the cost to a prohibitive degree.

An object of the present invention is to make a shock absorbing device which utilizes the principle of rubber loaded in shear, but which is so constructed that it can be manufactured at a low cost and can be readily applied to existing machinery and equipment without necessitating any changes in the construction thereof. The invention additionally contemplates a resilient shock absorbing device which combines the high vibration dampening properties of rubber loaded in shear with the safety, durability and ease of installation of a simple compression mount. Moreover, the invention provides a construction wherein the mount cannot be damaged by either temporary or permanent overloading.

An additional object of the present invention is to make a resilient mount which utilizes a combination shear and compression action, which provides adequate ventilation and maximum radiation of heat, and which will possess a high degree of internal dampening, thereby avoiding objectionable resonance. The invention also includes a design of shock absorbing device wherein the dampening unit can be assembled in various arrangements for obtaining a wide range of load support, and which when loaded will result in a structure wherein the resilient material is subjected to a shearing action in both a longitudinal and lateral direction.

Figure 8:
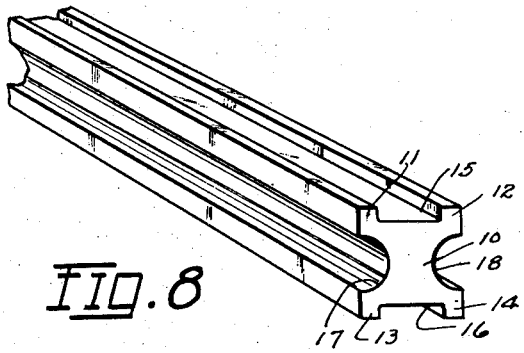
Figure 9:
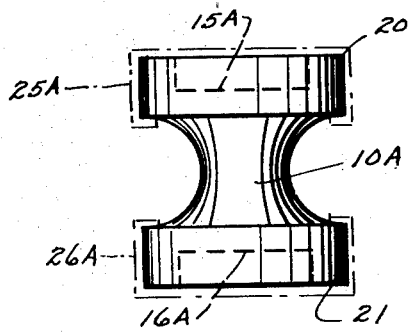
Figure 10:
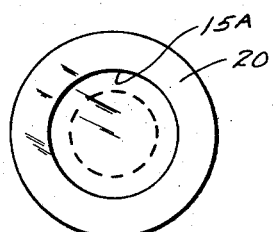
Figure 11:
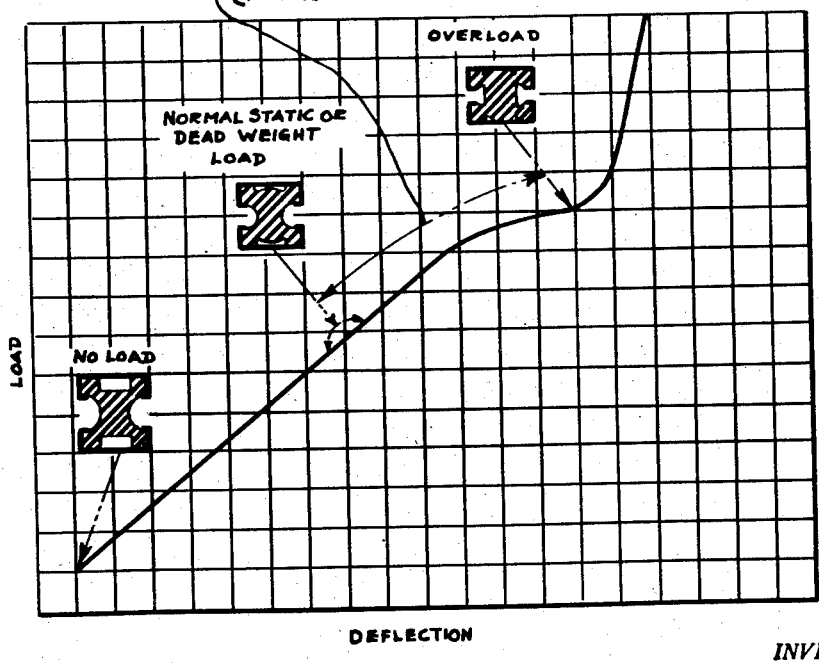

In the drawings, I have illustrated various embodiments of the invention, wherein Fig. 1 is a vertical view through a machine mount embodying the present invention; Fig. 2 is a horizontal section taken on a plane indicated by the line 2—2 in Fig. 1; Fig. 3 is a vertical section through a modified form of machine mount; Fig. 4 illustrates a cross-sectional view through one form of resilient body in unmounted position; Figs. 5, 6, and 7 illustrate progressively cross-sectional views through a mounted body in unloaded, normal load, and overload conditions respectively; Fig. 8 is a perspective view of a strip of resilient material embodying the shape illustrated in Fig. 4; Fig. 9 is a side view of a modified form of resilient body; Fig. 10 is a top plan view of a structure shown in Fig. 9, and Fig. 11 is a graph illustrating a load-deflection curve of a resilient mount embodying the present invention.

The principle governing the operation of the resilient body which comprises the present invention is the utilization of a column 10 which has integral portions 11 and 12 projecting outwardly and upwardly therefrom and has integral portions 13 and 14 projecting outwardly and downwardly therefrom which provide recesses 15 and 16 respectively at the top and bottom of the body, and recesses 17 and 18 at opposite sides of the body. Such formation is present in the configuration of Fig. 4 and also in the modified structure of Fig. 9.

The devices shown in Figs. 4 and 9 comprise resilient material, such as rubber, and in the representation of Fig. 4, the body is made in strip form, as shown in Fig. 8, whereas in the case of Fig. 9, the body is molded to a spool shape. In both forms of the invention, the top and bottom of the column are normally spaced from the objects or parts between which the body is disposed, contact being made only with the upper and lower surfaces of the arms 11 and 12 and feet 13 and 14 respectively in the case of the structure of Fig. 4, and with the annular portions 20 and 21 in the case of the spool-shaped structure of Fig. 9. The net result of such construction is to load the body under shear in the region of points of connection of the arms and feet to the column, as is shown in Fig. 5, it being understood that the size of the parts are chosen with respect to the load to be carried and that under normal load, the top and bottom surfaces of the column are out of contact with the upper and lower clamping members 25 and 26. In the event of overload, the top and bottom surfaces of the column will engage the upper and lower restraining members, thereby placing the resilient body in combined shear and compression as is shown in Fig. 7.

A preferred manner of mounting the resilient body having the shape of that shown in Fig. 8 is to clamp the upper portion within a sheet metal member 25 and the lower portion within a sheet metal member 26. Such members are channel-shaped structures having inturned flanges 27 and 28 respectively that extend for the full length of the resilient material. In the preferred arrangement, the resilient material is compressed for insertion into the clamping strips 25 and 26, as is shown in Fig. 4, where the dot and dash lines 30 and 31 illustrate the extent to which the material is compressed. Such action results in a preloading of the resilient body to an extent sufficient to retain it in position within the clamping strips during the subsequent assembling operation.

A cushioning device embodying the present invention is capable of use either singly or in multiple depending upon the load that is carried and the space available for use. Thus, in the embodiment of Figs. 1 and 2, I have illustrated four cushioning units, designated 35, 36, 37 and 38 which are arranged around a central aperture in top and bottom housing members 40 and 41 respectively, through which an anchor bolt 42 is adapted to extend. In Fig. 1 the bolt is positioned within a supporting structure 43 and extends through an aperture in a foot 44 that projects from a machine frame, indicated in general at 45. If desired, a washer 46 and a bushing 47 of resilient material may be used in conjunction with the bolt to prevent conduct of vibration from the machine frame through the bolt.

In the modification of Fig. 3, I utilize two cushioning units 35A and 36A within housings 40A and 41A respectively, and I rigidly affix one end of a stud bolt 42A to the housing 40A, as by welding, for permitting attachment to the foot of the machine frame, or other object to be supported, and I rigidly attach the bottom housing 41A to a base 50 which is provided with apertures for receiving bolts 51 and 52 that are attached to a supporting structure 53. Thus, it is apparent that the cushioning unit is well adapted for various arrangements depending upon the load to be carried and the space available for such purpose.

The modification of Fig. 9, as aforesaid, comprises a spool-shaped structure having a column 10A and having annular flanges 20 and 21 that provide upper and lower recesses 15A and 16A respectively. Such cushioning devices may be suitably provided with clamping members corresponding to those indicated at 25 and 26, except for the fact that in this case they will be circular in shape as shown by the broken lines 25A and 26A in Fig. 9.

In Fig. 11, I have illustrated a graph depicting the load-deflection curve with diagrammatic illustrations of the cushioning devices at points of no load, normal static or dead weight load, and overload respectively. The dynamic or vibration absorbing range is indicated between the points C and D, and the curve illustrates that it is substantially impossible to cause the resilient mount embodying this invention to resonate. The tendency for any resilient mount to resonate (and bounce) is a function of the slope of its load deflection-curve. Thus, when the disturbing frequency of a machine approaches the natural frequency of the mount, each successive impulse tends to be of greater amplitude and when the amplitude of the deflection reaches the condition represented by the dip in the curve an immediate "softness" of action is encountered which throws out of phase the natural frequency of the mount of the machine and the disturbing frequency of the imposed load. The action is somewhat similar to what occurs when a tennis ball is bounced against a concrete floor and then against a soft mattress. In the latter case, there is no bounce.

Advantages of a cushioning device embodying the present invention are that there can be no overloading of the shear element, that the design provides adequate ventilation and maximum radiation of heat, thereby greatly increasing the life of the unit, and that the use of two shear units with a dampening column therebetween results in a high internal dampening, thus reducing the possibility of resonance. As a result of the invention, a compression action relieves the tensional stresses, thereby minimizing fatigue of the rubber. The cushioning unit can be used for dampening vibration in vertical, horizontal or torsional loads, and can be used advantageously for mounting instruments on any type of support.

I claim:

1. A cushioning device comprising a strip of resilient material having spaced arms extending outwardly and upwardly therefrom, and having spaced feet extending outwardly and downwardly therefrom, said arms and feet extending longitudinally of the strip, a channel-shaped retaining member embracing the arms, a second channel-shaped retaining member embracing the feet, said arms and feet cooperating to provide recesses in the top, bottom and side portions of the strip, the distance between the recesses in the side portions of the strip being less than the width of the recesses in the top and bottom portions thereof.

2. A cushioning device embodying a plurality of cushioning units, each comprising a resilient body having a central columnar formation and having extensions projecting laterally and in opposite directions from the top and bottom surfaces thereof, a housing member enclosing the upper portion of said body, a second housing member enclosing the lower portion of said body, said housings having registering apertures therein for receiving a bolt or the like for attaching together two objects between which the cushioning device is interposed.

3. A cushioning device comprising a column of resilient material having a pair of upwardly and outwardly extending portions and a pair of downwardly and outwardly extending portions, said portions forming recesses in the top, bottom and side walls of said column, rigid retaining members extending across the top and bottom surfaces respectively of said resilient material bridging the recesses in said surfaces but normally out of contact with the walls of said recesses, said retaining members extending along the sides of said outwardly extending portions and thence inwardly along the walls of said portions into the recesses in the side walls of said column, said members acting to place respective pairs of outwardly extending portions and the portion of the column between the portions of respective pairs in compression in a plane extending transversely across the column prior to the application of a load to said device.

4. A cushioning device comprising a column of resilient material in strip form of the same transverse cross section throughout and having extensions in the form of ribs adjacent the top and bottom corners thereof, the ribs operating to provide recesses adjacent the top and bottom of the device and also adjacent the sides of the device, the mid-portion of said column being of a width less than the width of said recesses, and operating additionally to subject the device to shear when loaded either in a vertical or horizontal direction.

5. A cushioning device comprising a strip of resilient material having a centrally disposed columnar portion, and having portions thereof extending laterally and upwardly from the top portion, and having other portions extending laterally and downwardly from the bottom portion to provide recesses in the top, bottom and sides respectively, and clamping members embracing the extension at the respective ends of the device and extending across such ends and onto the sides thereof and thence inwardly into the side recess.

6. A cushioning device comprising a plurality of parallel strips of resilient material spaced apart, each strip having a central columnar structure and having ribs extending upwardly and downwardly from the end portions thereof, an operating to provide recesses in the top and bottom and sides thereof, and means for retaining such plurality of strips in spaced relation whereby they may be mounted as a unit for interposition between an object to be supported and a structure therefor.

7. A cushioning device comprising a pair of comparatively long parallel strips spaced apart laterally and a pair of comparatively short strips aligned with each other and located between said comparatively long strips whereby a space between all of said strips is provided for the passage of an anchoring bolt, each of said strips having a central column with spaced portions thereof extending upwardly and outwardly at one end and spaced portions extending downwardly and outwardly at the other end.

TRACY D. NATHAN.

REFERENCES CITED

The following references are of record in the file of this patent:

UNITED STATES PATENTS

| Number | Name | Date |
| --- | --- | --- |
| 1,732,648 | Flinterman | Oct. 22, 1929 |
| 1,929,201 | Frohlich et al. | Oct. 3, 1933 |
| 1,977,896 | Saurer | Oct. 23, 1934 |
| 2,037,033 | Lord | Apr. 14, 1936 |
| 2,041,353 | Kenney et al. | May 19, 1936 |
| 2,079,798 | Geyer | May 11, 1937 |
| 2,115,713 | Haire | May 3, 1938 |
| 2,232,667 | Saurer | Feb. 18, 1941 |
| 2,365,842 | Rosenzweing | Dec. 26, 1944 |

FOREIGN PATENTS

| Number | Country | Date |
| --- | --- | --- |
| 847,039 | France | Oct. 2, 1939 |